(12) United States Patent
Arthur et al.

(10) Patent No.: US 12,481,861 B2
(45) Date of Patent: Nov. 25, 2025

(54) HIERARCHICAL PARALLELISM IN A NETWORK OF DISTRIBUTED NEURAL NETWORK CORES

(71) Applicant: INTERNATIONAL BUSINESS MACHINES CORPORATION, Armonk, NY (US)

(72) Inventors: John V. Arthur, Mountain View, CA (US); Andrew S. Cassidy, San Jose, CA (US); Myron D. Flickner, San Jose, CA (US); Pallab Datta, San Jose, CA (US); Hartmut Penner, San Jose, CA (US); Rathinakumar Appuswamy, San Jose, CA (US); Jun Sawada, Austin, TX (US); Dharmendra S. Modha, San Jose, CA (US); Steven K. Esser, San Jose, CA (US); Brian Taba, Cupertino, CA (US); Jennifer Klamo, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1004 days.

(21) Appl. No.: 16/033,926

(22) Filed: Jul. 12, 2018

(65) Prior Publication Data

US 2020/0019836 A1 Jan. 16, 2020

(51) Int. Cl.
*G06N 3/04* (2023.01)
*G06N 3/063* (2023.01)

(52) U.S. Cl.
CPC ............. *G06N 3/04* (2013.01); *G06N 3/063* (2013.01)

(58) Field of Classification Search
CPC ........... G06N 3/04; G06N 3/063; G06N 20/00
See application file for complete search history.

(56) References Cited

U.S. PATENT DOCUMENTS 6,654,730 B1 * 11/2003 Kato ...................... G06N 3/063
706/15
9,710,265 B1 * 7/2017 Temam ................. G06N 3/063
(Continued)

FOREIGN PATENT DOCUMENTS

CN 107454966 A 12/2017
CN 107622303 A 1/2018
(Continued)

OTHER PUBLICATIONS

Li, W. et al.; "Parallel Multiclass Support Vector Machine for Remote Sensing Data Classification on Multicore and Many-Core Architectures"; IEEE Journal of Selected Topics in Applied Earth Observations and Remote Sensing; 2017.
(Continued)

*Primary Examiner* — Daniel T Pellett
(74) *Attorney, Agent, or Firm* — Amin, Turocy & Watson, LLP

(57) ABSTRACT

Networks of distributed neural cores are provided with hierarchical parallelism. In various embodiments, a plurality of neural cores is provided. Each of the plurality of neural cores comprises a plurality of vector compute units configured to operate in parallel. Each of the plurality of neural cores is configured to compute in parallel output activations by applying its plurality of vector compute units to input activations. Each of the plurality of neural cores is assigned a subset of output activations of a layer of a neural network for computation. Upon receipt of a subset of input activations of the layer of the neural network, each of the plurality of neural cores computes a partial sum for each of its assigned output activations, and computes its assigned output activations from at least the computed partial sums.

22 Claims, 5 Drawing Sheets

(56) References Cited

U.S. PATENT DOCUMENTS

| | | |
|---|---|---|
| 10,049,322 B2 | 8/2018 | Ross |
| 2016/0098629 A1 | 4/2016 | Lipasti et al. |
| 2017/0154259 A1 | 6/2017 | Burr et al. |
| 2018/0046906 A1* | 2/2018 | Dally ................ G06N 3/04 |
| 2018/0046916 A1 | 2/2018 | Dally et al. |
| 2018/0121377 A1* | 5/2018 | Woo ................ G06N 3/045 |
| 2018/0121786 A1* | 5/2018 | Narayanaswami .... G06N 3/063 |
| 2018/0189651 A1* | 7/2018 | Henry ................ G06N 3/04 |

FOREIGN PATENT DOCUMENTS

| | | |
|---|---|---|
| CN | 112384935 A | 2/2021 |
| EP | 3821376 A1 | 5/2021 |
| JP | H 04 021153 A | 1/1992 |
| JP | H05-346914 A | 12/1993 |
| JP | 2001/188767 A | 7/2001 |
| JP | 2021-532451 A | 11/2021 |
| WO | 2016/174113 A1 | 11/2016 |
| WO | 2016/186810 A1 | 11/2016 |
| WO | 2020/011936 A1 | 1/2020 |

OTHER PUBLICATIONS

Hegde, V. et al.; "Parallel and Distributed Deep Learning"; Stanford University, vishakh@stanford.edu <mailto:vishakh@stanford.edu>. 2016.

"An FPGA Architecture for Accelerating Convolutional Neural Network in Speech Recognition"; <http://ip.com/IPCOM/000247151D>; Aug. 11, 2016.

"Reconfigurable Communication Network with Distributed Control"; <http://ip.com/IPCOM/000240011D>; Dec. 22, 2014.

"Egps: Exploratory Graph Processing System";< http://ip.com/IPCOM/000239478D>; Nov. 11, 2014.

International Search Report and Written Opinion for International Application No. PCT/EP2019/068713 dated Oct. 21, 2019.

Notice of Reasons for Refusal (English Translation), JP Patent Application No. 2021-500263, issued Dec. 20, 2022, 4 pages.

Notice of Reasons for Refusal (English Translation), JP Patent Application No. 2021-500263, issued July, 5, 2023.

Office Action for EP Application No. 19748724.2 dated Feb. 14, 2024.

* cited by examiner

HIERARCHICAL PARALLELISM IN A NETWORK OF DISTRIBUTED NEURAL NETWORK CORES

BACKGROUND

Embodiments of the present disclosure relate to neural computation, and more specifically, to hierarchical parallelism in networks of distributed neural cores.

BRIEF SUMMARY

According to embodiments of the present disclosure, systems for neural computation are provided. In various embodiments, a plurality of neural cores is provided. Each of the plurality of neural cores comprises a plurality of vector compute units configured to operate in parallel. Each of the plurality of neural cores is configured to compute in parallel output activations by applying its plurality of vector compute units to input activations. Each of the plurality of neural cores is assigned a subset of output activations of a layer of a neural network for computation. Upon receipt of a subset of input activations of the layer of the neural network, each of the plurality of neural cores computes a partial sum for each of its assigned output activations, and computes its assigned output activations from at least the computed partial sums.

According to embodiments of the present disclosure, methods of and computer program products for neural computation are provided. In various embodiments, a subset of input activations of a layer of a neural network is received at each of a plurality of neural cores. Each of the plurality of neural cores comprises a plurality of vector compute units configured to operate in parallel. Each of the plurality of neural cores is configured to compute in parallel output activations by applying its plurality of vector compute units to input activations. A subset of output activations of a layer of a neural network is assigned to each of the plurality of neural cores for computation. Upon receipt of a subset of input activations of the layer of the neural network, each of the plurality of neural cores: computes a partial sum for each of its assigned output activations, and computes its assigned output activations from at least the computed partial sums.

DETAILED DESCRIPTION

Figure 1:
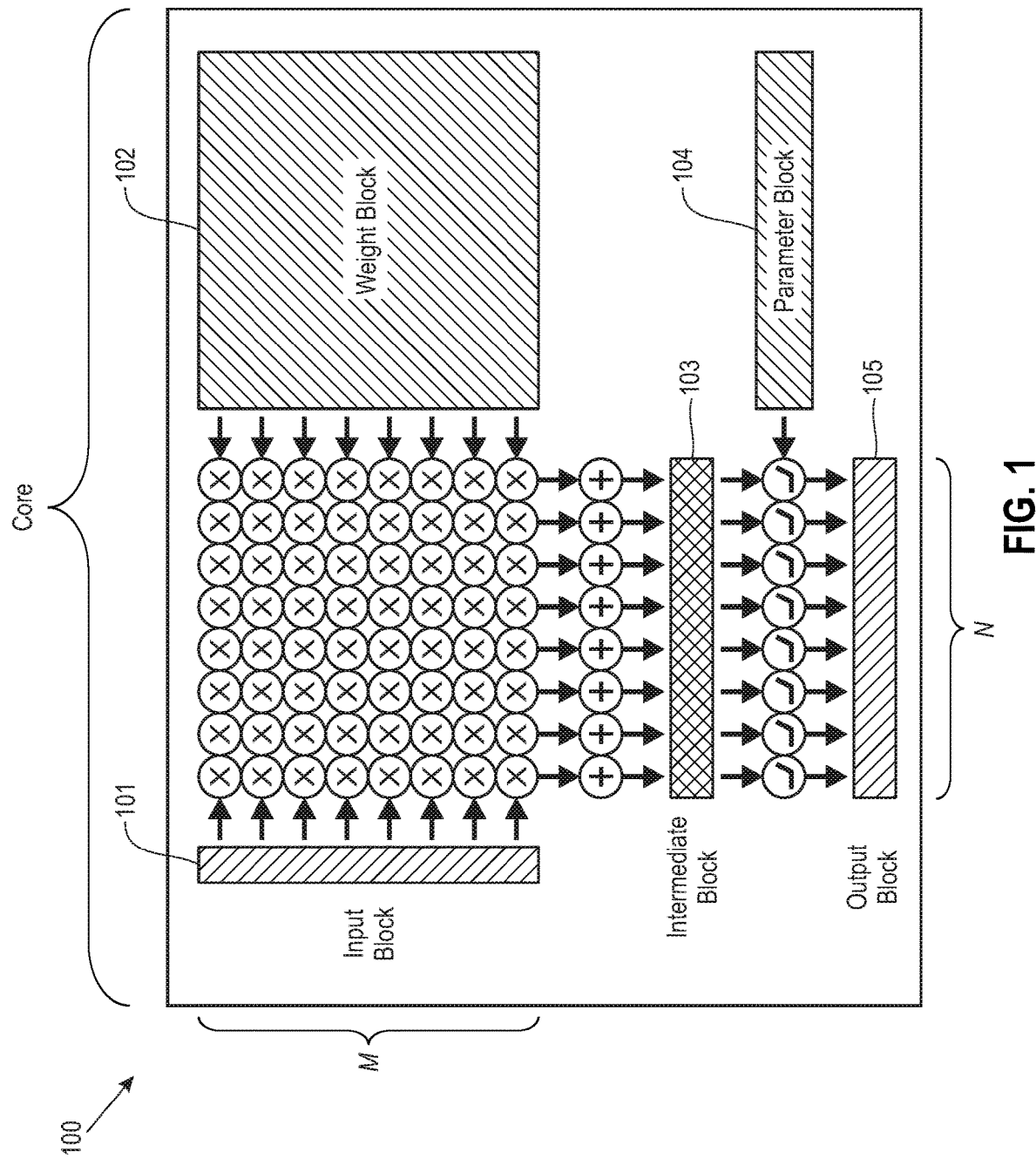
FIG. 1 illustrates a neural core according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions $\sigma$ in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function $\sigma$.

An element of a layer's output data tensor Y can be computed as in Equation 1 where the neuron activation function $\sigma$ is configured by the vector of activation function parameters $V[i,j,k,:]$, and the weighted sum $Z[i,j,k]$ can be computed as in Equation 2.

$$Y[i, j, k] = \sigma(V[i, j, k, :]; Z[i, j, k]) \quad \text{Equation 1}$$

$$Z[i, j, k] = \sum_{a=1}^{A} \sum_{b=1}^{B} \sum_{c=1}^{C} W[i, j, k, a, b, c] \cdot X[a, b, c] \quad \text{Equation 2}$$

For simplicity of notation, the weighted sum in Equation 2 may be referred to as the output, which is equivalent to using a linear activation function $Y[i,j,k]=\sigma(Z[i,j,k])=Z[i,j,k]$, with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

It will be apparent from the above that neural networks are inherently parallel structures. Neurons in a given layer receive inputs, X with elements $x_i$ from one or more layers or other inputs. Each neuron computes its state, $y \in Y$ based on the inputs and weights W with elements $w_i$. In various embodiments, the weighted sum of inputs is adjusted by a bias b, and then the result is passed to a nonlinearity $F(\cdot)$. For example, a single neuron activation may be expressed as $y=F(b+\Sigma x_i w_i)$.

Because all neurons in a given layer receive inputs from the same layers and compute their outputs independently, neuron activations can be computed in parallel. Because of this aspect of the overall neural network, performing computation in parallel distributed cores accelerates overall computation. Further, within each core vector operations can be computed in parallel. Even with recurrent inputs, for example when a layer projects back to itself, all neurons are still updated simultaneously. Effectively, the recurrent connections are delayed to align with a subsequent input to the layer.

With reference now to FIG. 1, a neural core according to embodiments of the present disclosure is depicted. A neural core 100 is a tileable computational unit that computes one block of an output tensor. A neural core 100 has M inputs and N outputs. In various embodiments, M=N. To compute an output tensor block, a neural core multiplies an M×1 input tensor block 101 with an M×N weight tensor block 102 and accumulates the products into weighted sums that are stored in a 1×N intermediate tensor block 103. A O×N parameter tensor block contains the O parameters that specify each of the N neuron activation functions that are applied to the intermediate tensor block 103 to produce a 1×N output tensor block 105.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

In embodiments including multiple cores in an array, each core implements a part of an overall neural network's computation. In a given layer with $_{NNEURON}$ output neurons indexed by $j=^1:N_{NEURON}$ with $N_{INPUT}$ input neurons whose value are $x_i$, indexed by $i=1:N_{INPUT}$, then the value of a an output of the layer is given by Equation 3 for $j=1:N_{NEURON}$ and $i=1:N_{INPUT}$.

$$Y_j=F(b_j+\Sigma x_i w_{ji}) \qquad \text{Equation 3}$$

In some embodiments, each core computes some number of output neurons. For $N_{CORE}$ cores, each core computes on average $N_{NEURON}/N_{CORE}$ output neurons, each receiving all inputs. In this case, all cores need all inputs but only compute a fraction of outputs. For example:

Core 1 computes: $Y_j=F(b_j+\Sigma x_i w_{ji})$ for $j=1:N_{NEURON}/N_{CORE}$ and $i=1:N_{INPUT}$ Core 2 computes: $Y_j=F(b_j+\Sigma x_i w_{ji})$ for $j=N_{NEURON}/N_{CORE}+1:2N_{NEURON}/N_{CORE}$ and $i=1:N_{INPUT}$ Core $k$ computes: $Y_j=F(b_j+\Sigma x_i w_{ji})$ for $j=(k-1)N_{NEURON}/N_{CORE}+1:kN_{NEURON}/N_{CORE}$ and $i=1:N_{INPUT}$ Core $N_{CORE}$ computes: $Y_j=F(b_j+\Sigma x_i w_{ji})$ for $j=(N_{CORE}-1)N_{NEURON}/N_{CORE}+1:N_{NEURON}$ and $i=1:N_{INPUT}$ In some embodiments, each core computes all output neurons but only for a subset of inputs. For $N_{CORE}$ cores, each core computes all output neurons for on average $N_{INPUT}/N_{CORE}$ input neurons. In this case, cores need only a fraction of inputs but the outputs need to be collected and summed. For example:

Core 1 computes: $Y_{j\_core1}=\Sigma x_i w_{ji}$ for $j=1:N_{NEURON}$ and $i=1:N_{INPUT}/N_{CORE}$ Core 2 computes: $Y_{j\_core2}=\Sigma x_i w_{ji}$ for $j=1:N_{NEURON}$ and $i=N_{INPUT}/N_{CORE}+1:2N_{INPUT}/N_{CORE}$ Core $k$ computes: $Y_{j\_corek}=\Sigma x_i w_{ji}$ for $j=1:N_{NEURON}$ and $i=(k-1)N_{INPUT}/N_{CORE}+1:kN_{NEURON}/N_{CORE}$ Core $N_{CORE}$ computes: $Y_{j\_coreNCORE}=\Sigma x_i w_{ji}$ for $j=1:N_{NEURON}$ and $i=(N_{CORE}-1)N_{INPUT}/N_{CORE}+1:N_{INPUT}$ To arrive at a complete result, $Y_j=F(b_j+\Sigma Y_{i\_corek})$ for $j=1:N_{NEURON}/N_{CORE}$ and $k=1:N_{CORE}$. In various embodiments, the complete result is computed among the cores or off-core.

In some implementation, each core computes some number of output neurons but without each core having access to all of the input neurons. In such embodiments, each core computes partial outputs and passes them around until each core has all of the partials it needs to completely compute its set of neurons. In such embodiments, cores only need to pass information (partial sums) that are non-zero, allowing the array to exploit the high-level structure of the neural network layers. For example, convolutional neural networks require less computation and communication of inputs, outputs, and partial sums. For example:

Core 1 computes: $Y_{j\_core1}=\Sigma x_i w_{ji}$ for $j=1:N_{NEURON}$ and $i=1:N_{INPUT}/N_{CORE}$ Core 2 computes: $Y_{j\_core2}=\Sigma x_i w_{ji}$ for $j=1:N_{NEURON}$ and $i=N_{INPUT}/N_{CORE}+1:2N_{INPUT}/N_{CORE}$ Core $k$ computes: $Y_{j\_corek}=\Sigma x_i w_{ji}$ for $j=1:N_{NEURON}$ and $i=(k-1)N_{INPUT}/N_{CORE}+1:kN_{NEURON}/N_{CORE}$ Core $N_{CORE}$ computes: $Y_{j\_coreNCORE}=\Sigma x_i w_{ji}$ for $j=1:N_{NEURON}$ and $i=(N_{CORE}-1)N_{INPUT}/N_{CORE}+1:N_{INPUT}$ Then a complete result is computed either sequentially or overlapped. $Y_j=F(b_j+\Sigma Y_{i\_corek})$ for $j=1:N_{NEURON}/N_{CORE}$ and $k=1:N_{CORE}$.

Figure 2:
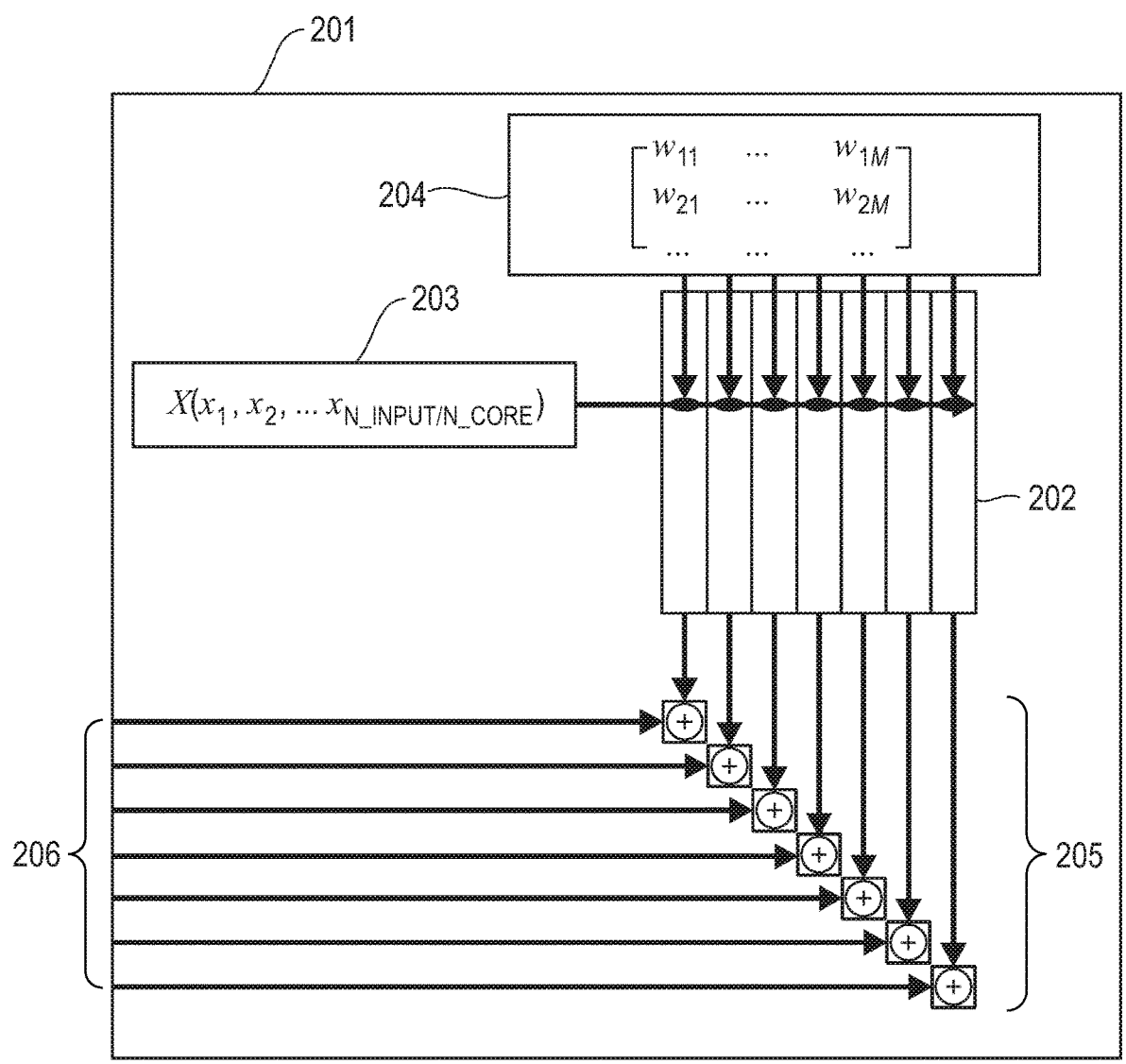
FIG. 2 illustrates an exemplary neural core showing inter-core parallelism according to embodiments of the present disclosure.

Core 1 computes: $Y_j=F(b_j+\Sigma Y_{j\_corek})$ for $j=1:N_{NEURON}/N_{CORE}$ and $k=1:N_{CORE}$ Core 2 computes: $Y_j=F(b_j+\Sigma Y_{j\_corek})$ for $j=N_{NEURON}/N_{CORE}+1:2N_{NEURON}/N_{CORE}$ and $k=1:N_{CORE}$ Core $k$ computes: $Y_j=F(b_j+\Sigma Y_{j\_corek})$ for $j=(k-1)N_{NEURON}/N_{CORE}+1:kN_{NEURON}/N_{CORE}$ and $k=1:N_{CORE}$ Core $N_{CORE}$ computes: $Y_j=F(b_j+Y_{j\_corek})$ for $j=(N_{CORE}-1)N_{NEURON}/N_{CORE}+1:N_{NEURON}$ and $k=1:N_{CORE}$ With reference now to FIG. 2, an exemplary neural core showing inter-core parallelism is illustrated. Core 201 includes crossbar 202 comprising parallel vector compute units, which receives inputs 203 $X=[x_1, \ldots, x_{N_{INPUT}/N_{CORE}}]$ and multiplies them by parameters $$\begin{bmatrix} w_{11} & \ldots & w_{1M} \\ w_{21} & \ldots & w_{2M} \\ \ldots & \ldots & \ldots \end{bmatrix}$$

where $M=N_{INPUT}/N_{CORE}$. The results of the matrix multiplication are provided to parallel sum and nonlinearity units 205, which receive partial sum inputs $Y_{i\_corek}$ 206 from other cores in the array.

As noted above, each core in an array includes parallel/concurrent neural network compute elements. For example, a given core k computes:

$Y_{j\_corek}=\Sigma x_i w_{ji}$ for $j=1:N_{NEURON}$ and $i=(k-1)N_{INPUT}/N_{CORE}+1:kN_{NEURON}/N_{CORE}$ and/or it computes $Y_j=F(b_j+\Sigma Y_{j,corek})$ for $j=(k-1)N_{NEURON}/N_{CORE}+1:kN_{NEURON}/N_{CORE}$ and $k=1:N_{CORE}$ The $N_{NEURON}$ partial sums ($Y_{j\_corek}$) can be computed at the same time with separate vector units, each computing vector multiply and sum ($\Sigma x_i w_{ji}$) for a single neuron j. The $N_{NEURON}$ sum and nonlinearity ($Y_j$) can be computed at the same time with separate accumulation and nonlinear units, each computing for a single neuron j.

Figure 3:
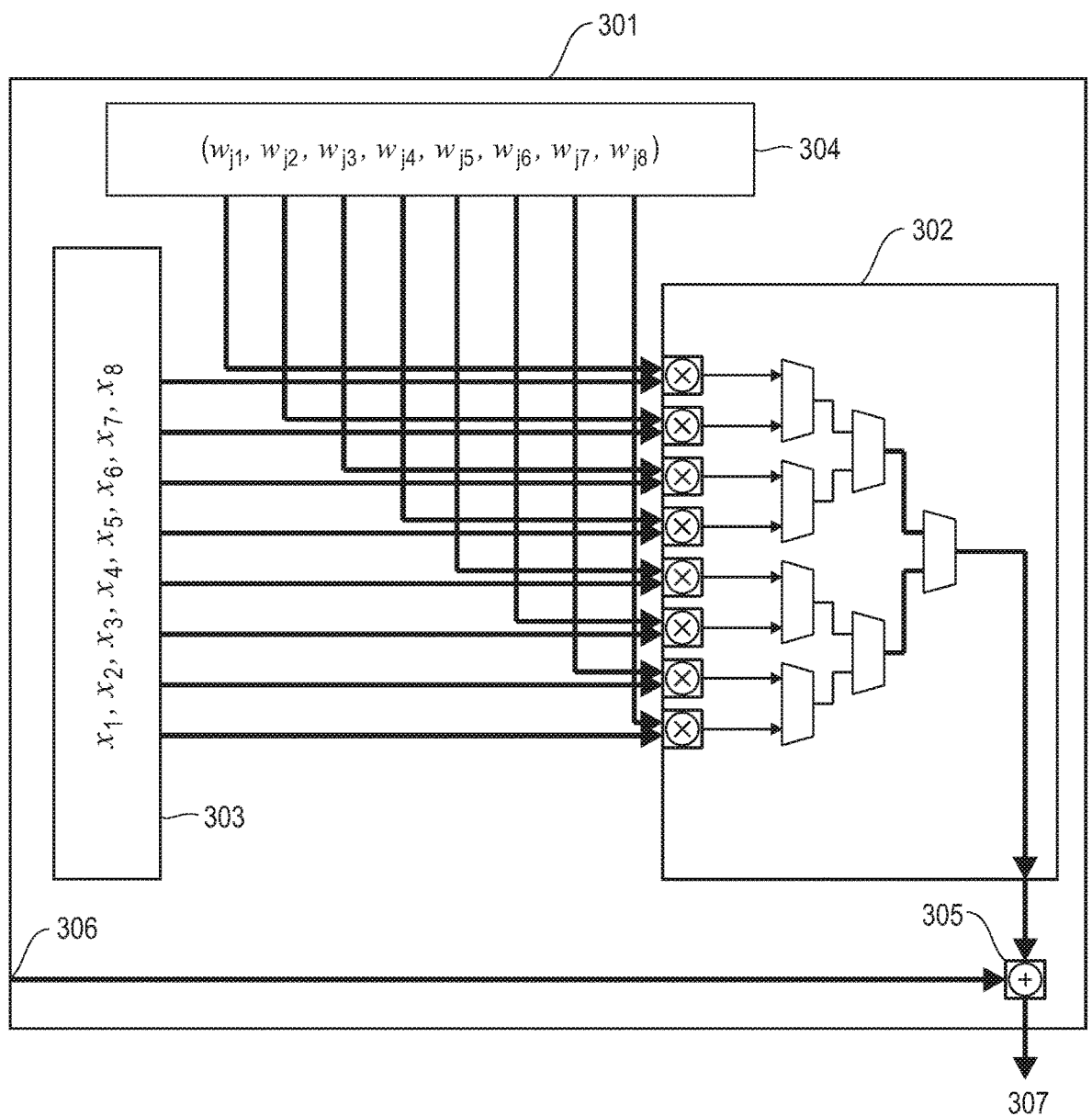
FIG. 3 illustrates an exemplary neural core showing intra-core parallelism according to embodiments of the present disclosure.

With reference now to FIG. 3, an exemplary neural core showing intra-core parallelism is illustrated. Core 301 includes vector multiply/sum unit 302 (which corresponds to one of the units 202 in FIG. 2), which receives inputs 303 $[x_1, \ldots, x_8]$ and multiplies them by parameters 304 $[w_{j1}, \ldots, w_{j8}]$. The results of the matrix multiplication are provided to parallel sum and nonlinearity unit 305, which receive partial sum input 306 from other cores in the array and provides neuron output 307. Accordingly, a given vector unit can operate on many inputs at once to produce a single output or multiple outputs.

As set out above, the vector units each compute in a parallel/concurrent manner. For example, the $j^{th}$ vector unit of the $k^{th}$ core computes $Y_{j\_corek}=\Sigma x_i w_{ji}$. This operation can be performed in parallel/concurrently. The vector unit performs parallel summations, using for example a summation tree, which can be pipelined to further increase concurrency. For example if i=1:8 (as pictured), the vector unit would implement eight parallel multiplications, followed by four 2-input additions, followed by two 2-input additions, followed by one 2-input addition. These four parallel operations may be pipelined, running concurrently for higher throughput.

Referring to Table 1, a variety of total core array parallelism values are given for core array sizes (columns 1×1 . . . 64×64) and cross-bar sizes (rows 1×1 . . . 1024×1024). Total parallelism is the product of the core array size and crossbar sizes.

TABLE 1

|  | 1 × 1 | 2 × 2 | 4 × 4 | 8 × 8 | 16 × 16 | 32 × 32 | 64 × 64 |
|---|---|---|---|---|---|---|---|
| 1 × 1 | 1 | 4 | 16 | 64 | 256 | 1024 | 4096 |
| 16 × 16 | 256 | 1024 | 4096 | 16384 | 65536 | 262144 | 1048576 |
| 32 × 32 | 1024 | 4096 | 16384 | 65536 | 262144 | 1048576 | 4194304 |
| 64 × 64 | 4096 | 16384 | 65536 | 262144 | 1048576 | 4194304 | 16777216 |
| 256 × 256 | 65536 | 262144 | 1048576 | 4194304 | 16777216 | 67108864 | 268435456 |
| 1024 × 1024 | 1048576 | 4194304 | 16777216 | 67108864 | 268435456 | 536870912 | 4294967296 |

Figure 4:
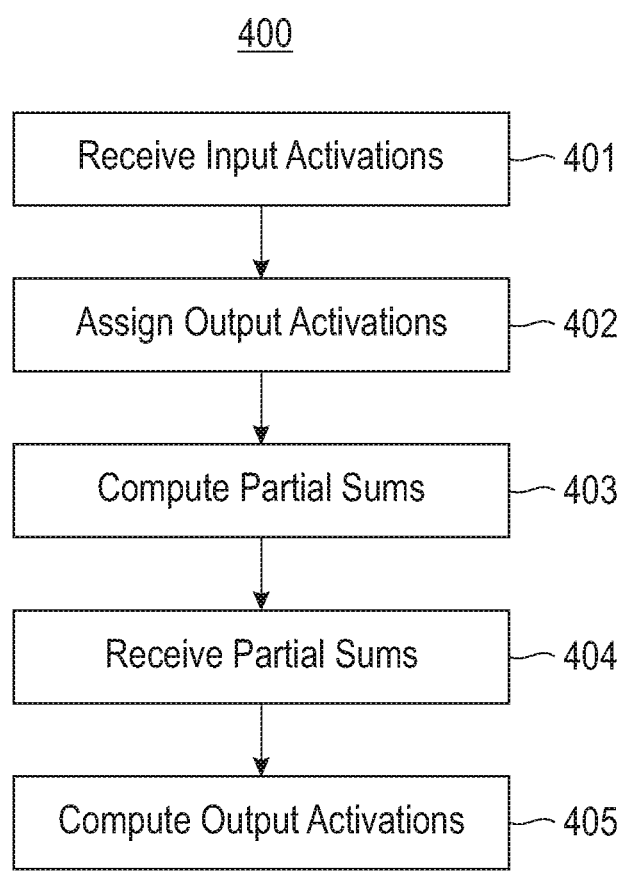
FIG. 4 illustrates a method of neural computation according to embodiments of the present disclosure.

Referring to FIG. 4, a method of neural computation is illustrated according to embodiments of the present disclosure. At 401, a subset of input activations of a layer of a neural network is received at each of a plurality of neural cores. Each of the plurality of neural cores comprises a plurality of vector compute units configured to operate in parallel. Each of the plurality of neural cores is configured to compute in parallel output activations by applying its plurality of vector compute units to input activations. At 402, a subset of output activations of a layer of a neural network is assigned to each of the plurality of neural cores for computation. Upon receipt of a subset of input activations of the layer of the neural network, each of the plurality of neural cores: computes a partial sum for each of its assigned output activations at 403, and computes its assigned output activations from at least the computed partial sums 405. In some embodiments, each of the plurality of cores receives partial sums for at least one of its assigned output activations from another of the plurality of neural cores at 404, and computes its assigned output activations from the computed partial sums and the received partial sums at 405.

It will be appreciated that neural networks are provided herein may be used as a classifier or a generator.

Figure 5:
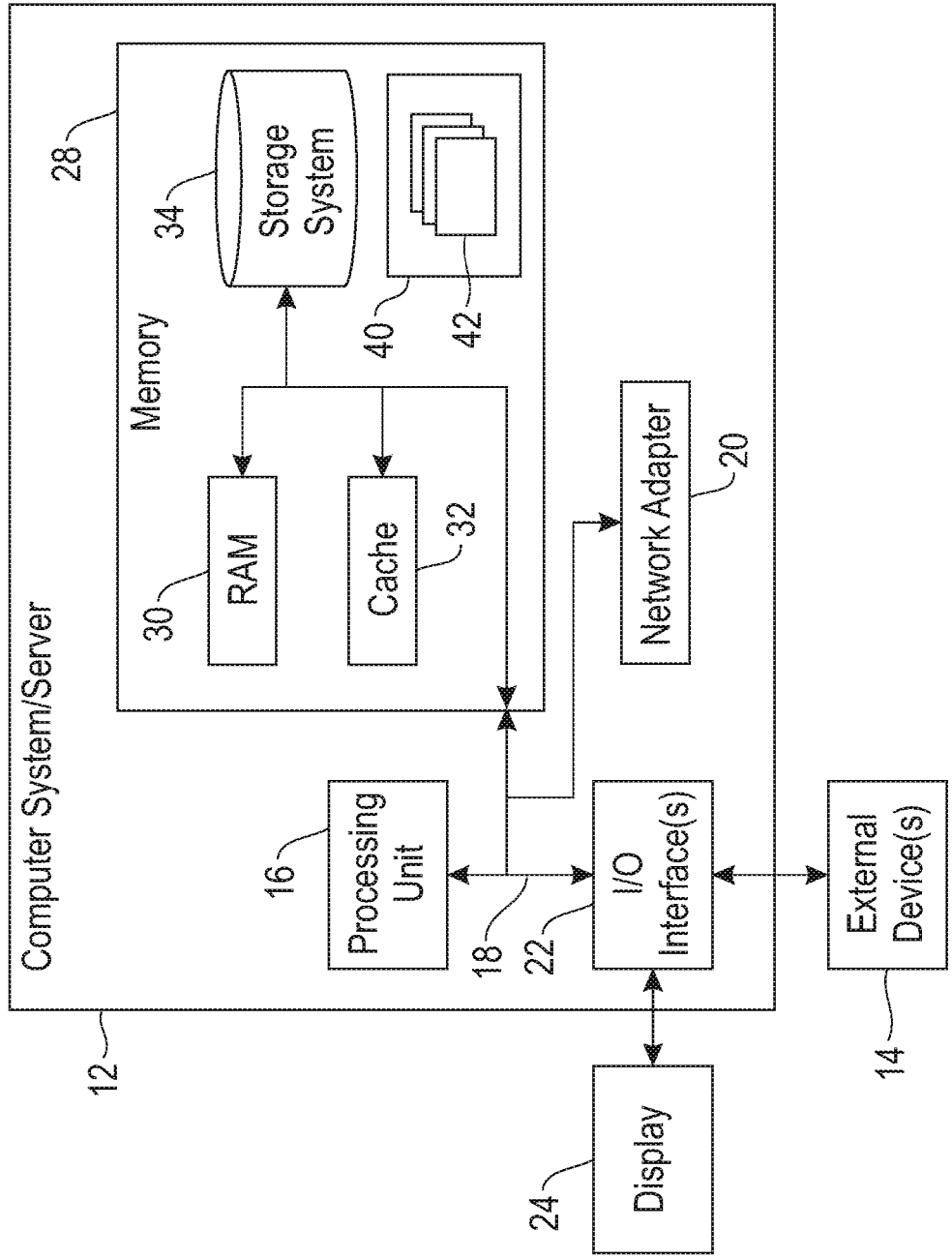
FIG. 5 depicts a computing node according to an embodiment of the present disclosure.

Referring now to FIG. 5, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In various embodiments, one or more inference processing unit (not pictured) is coupled to bus 18. In such embodiments, an IPU may receive data from or write data to memory 28 via bus 18. Likewise, an IPU may interact with other components via bus 18 as described herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A neural inference chip, comprising:
   a plurality of neural cores comprising a first neural core and a second neural core, each neural core of the plurality of neural cores comprising a plurality of vector compute units and a parallel sum and nonlinearity unit such that the first neural core comprises a first plurality of vector compute units and a first parallel sum and nonlinearity unit and the second plurality of vector compute units comprises a second plurality of vector compute units and a second parallel sum and nonlinearity unit, wherein:
   each of the plurality of neural cores is configured to compute in parallel output activations by applying its plurality of vector compute units to input activations and applying a nonlinear function by its parallel sum and nonlinearity unit such that the first neural core is configured to compute output activations by applying the first plurality of vector compute units to input activations and applying a nonlinear function by the first parallel sum and nonlinearity unit;
   each output activation of a layer of an artificial neural network is assigned to at least one neural core of the plurality of neural cores such that the first neural core is assigned to a subset of output activations of the layer for computation;
   the first and second pluralities of vector compute units each comprise multiplication and addition units;

the second neural core of the plurality of neural cores computes zero and non-zero partial sums;

the second neural core directly communicates its non-zero partial sums with the first parallel sum and nonlinearity unit of via a wire without communicating its zero partial sums.

2. The neural inference chip of claim 1, wherein:

upon receipt of a subset of input activations of the layer of the artificial neural network, each of the plurality of neural cores computes a partial sum for each of its assigned output activations, and computes its assigned output activations from at least the computed partial sums.

3. The neural inference chip of claim 2, wherein upon receipt of a subset of input activations of the layer of the artificial neural network, each of the plurality of neural cores receives partial sums for at least one of its assigned output activations from another of the plurality of neural cores, and computes its assigned output activations from the computed partial sums and the received partial sums.

4. The neural inference chip of claim 2, wherein the plurality of neural cores perform said partial sum computation in parallel.

5. The neural inference chip of claim 2, wherein the plurality of neural cores perform said output activation computation in parallel.

6. The neural inference chip of claim 2, wherein computing the partial sum comprises applying at least one of the plurality of vector compute units to multiply the input activations and synaptic weights.

7. The neural inference chip of claim 2, wherein computing the assigned output activations comprises applying a plurality of addition units.

8. The neural inference chip of claim 2, wherein the plurality of vector compute units are configured to:

perform a plurality of multiply operations in parallel;
perform a plurality of additions in parallel; and
accumulate the partial sum.

9. The neural inference chip of claim 2, wherein the plurality of vector compute units are configured to compute partial sums in parallel.

10. The neural inference chip of claim 1, wherein the plurality of vector compute units comprise accumulation units.

11. The neural inference chip of claim 1, wherein said computation of the subset of output activations of a layer of the artificial neural network by each of the plurality of neural cores is pipelined.

12. The neural inference chip of claim 11, wherein each of the plurality of neural cores is configured to concurrently perform each stage of a plurality of stages of said computation of the subset of output activations of a layer of the artificial neural network.

13. The neural inference chip of claim 12, wherein said computation of the subset of output activations of a layer of the artificial neural network maintains parallelism.

14. The neural inference chip of claim 1, wherein each neural core of the plurality of neural cores computes its zero and non-zero partial sums simultaneously and separately computes all of its assigned subset of output activations simultaneously.

15. A method comprising:

receiving, at each neural core of a plurality of neural cores, a subset of input activations of a layer of an artificial neural network such that a first subset of input activations of a first layer is received at a first neural core of the plurality, wherein:

each neural core of the plurality of neural cores comprises a plurality of vector compute units and a parallel sum and nonlinearity unit such that the first neural core comprises a first plurality of vector compute units and a first parallel sum and nonlinearity unit and the second plurality of vector compute units comprises a second plurality of vector compute units and a second parallel sum and nonlinearity unit, and each of the plurality of neural cores is configured to compute in parallel output activations by applying its plurality of vector multipliers to its subset of input activations and applying a nonlinear function by its parallel sum and nonlinearity unit such that the first neural core is configured to compute output activations by applying the first plurality of vector compute units to the first subset of input activations of the first layer and applying a nonlinear function by the first parallel and nonlinearity unit;

assigning each output activation of the first layer to a neural core of the plurality of neural cores such that the first neural core is assigned to a first subset of output activations of the first layer for computation; and upon receipt of the first subset of input activations of the layer of the artificial neural network, the first neural core computing a partial sum for each output activation of the first subset of output activations, and computing the first subset of output activations from at least the computed partial sums, wherein the first and second plurality of vector compute units each comprise multiplication and addition units, the second neural core of the plurality of neural cores computes zero and non-zero partial sums, and the second neural core directly communicates its non-zero partial sums with the first parallel sum and nonlinearity unit of via a wire without communicating its zero partial sums.

16. The method of claim 15, wherein upon receipt of a subset of input activations of the layer of the artificial neural network, each of the plurality of neural cores receives non-zero partial sums for at least one of its assigned output activations from another of the plurality of neural cores, and computes its assigned output activations from the computed partial sums and the received non-zero partial sums.

17. The method of claim 15, wherein the plurality of vector compute units comprise accumulation units.

18. The method of claim 15, wherein the plurality of neural cores perform said partial sum computation in parallel.

19. The method of claim 15, wherein the plurality of neural cores perform said output activation computation in parallel.

20. The method of claim 15, wherein computing the partial sum comprises applying at least one of the plurality of vector compute units to multiply the input activations and synaptic weights.

21. The method of claim 15, wherein computing the assigned output activations comprises applying a plurality of addition units.

22. The method of claim 15, further comprising:
performing a plurality of multiply operations in parallel;
performing a plurality of additions in parallel; and
accumulating the partial sum.

* * * * *